United States Patent [19]

Leidl

[11] Patent Number: 6,016,834

[45] Date of Patent: Jan. 25, 2000

[54] PROPANE VEHICLE TANK AND SHUT-OFF VALVE

[76] Inventor: Jacob John Leidl, 29 Mallard Court, Guelph, Ontario, Canada, N1C 1B3

[21] Appl. No.: 08/623,365

[22] Filed: Mar. 28, 1996

[51] Int. Cl.[7] .................................................... E03B 11/00
[52] U.S. Cl. .......................... 137/571; 137/102; 137/109; 137/576; 137/599.2
[58] Field of Search .................................... 137/102, 107, 137/109, 571, 576, 599.2, 588

[56] References Cited

U.S. PATENT DOCUMENTS

| | | |
|---|---|---|
| 1,410,104 | 3/1922 | Lindsey, Jr. . |
| 1,419,145 | 1/1922 | Kleinberg ................................. 137/576 |
| 1,432,111 | 10/1922 | Lewis . |
| 1,732,505 | 10/1929 | Dawson . |
| 2,012,362 | 8/1935 | Thomas . |
| 2,296,598 | 9/1942 | Cook . |
| 2,321,095 | 1/1943 | Mantz ................................. 137/599.2 |
| 2,470,368 | 5/1949 | Paxton . |
| 2,675,793 | 4/1954 | Ziege . |
| 2,677,939 | 5/1954 | Clute . |
| 2,924,237 | 2/1960 | Ellis ..................................... 137/599.2 |
| 3,094,143 | 6/1963 | Beach . |
| 3,095,006 | 6/1963 | Smith ................................... 137/599.2 |
| 3,320,981 | 5/1967 | Loewenthal . |
| 3,409,040 | 11/1968 | Weston et al. . |
| 3,456,686 | 7/1969 | Kemble et al. ........................ 137/576 |
| 3,605,808 | 9/1971 | Fisher ................................... 137/599.3 |
| 3,659,742 | 5/1972 | Tagawa . |
| 3,710,809 | 1/1973 | Brown et al. .......................... 137/571 |
| 4,723,573 | 2/1988 | Burnett ................................. 137/571 |
| 5,199,286 | 4/1993 | Jakubas . |
| 5,411,058 | 5/1995 | Welsh . |

FOREIGN PATENT DOCUMENTS

| | | | |
|---|---|---|---|
| 212828 | 7/1956 | Austria | .................................. 137/109 |

OTHER PUBLICATIONS

Junge and Stauffer, Logic Valves, IBM Technical Dlsclosure Bulletin, vol. 8, No. 12, May 1966.

*Primary Examiner*—Denise L. Ferensic
*Assistant Examiner*—Joanne Kim
*Attorney, Agent, or Firm*—Young & Basile, P.C.

[57] ABSTRACT

A dual tank storage system for fuel having gaseous and liquid phases where one tank is a main storage tank and the other is an expansion tank. The system has a valve assembly on the exterior of the system for permitting fuel to flow from the main storage tank to the expansion tank in order to relieve pressure in the main storage tank. The valve assembly permits only the main storage tank to be filled. The fact that fuel can flow from the main storage compartment to the expansion compartment to relieve pressure from the main storage compartment allows the main storage tank to be filled to 100% capacity. The valve assembly includes a valve chamber and a valve plunger movable in the chamber between a normal operating position and a tank filling position. A coil spring biases the plunger towards the normal operating position. A filling port for fuel leads to the valve chamber which opens into a port of the storage tank. Fuel is drawn only from the expansion tank. The system may include a back pressure relief valve which allows fuel that is trapped in the lines and fittings between the tank shut off valve and the fuel lock-off to flow back into the tank when a maximum pressure is reached in the line between the tank shut-off valve and the fuel lock-off.

19 Claims, 3 Drawing Sheets

PROPANE VEHICLE TANK AND SHUT-OFF VALVE

BACKGROUND OF THE INVENTION

This invention relates to fuel storage systems and filling apparatus therefor. The use of propane as a fuel source for engines, including automobile engines, has become desirable due to the increased fuel economy which is often afforded by this fuel source. Propane as a fuel source for engines also has the advantage of allowing for decreased levels of undesirable exhaust emissions.

Due to the high thermal expansion coefficient of liquid propane, the overfilling of propane tanks is clearly dangerous. Expansion of the propane fuel can lead to leakage from the tank whereby gaseous and liquid fuel can accumulate under a vehicle equipped with a propane tank, thus posing a significant fire and explosion hazard. Also, in a situation where an extreme expansion occurs, for example where the tank is filled in sub-zero conditions and is subsequently stored in a hot environment, the expansion can lead to an explosion. To address the problem of thermal expansion, propane vehicle tanks now in use are usually single or double compartment vessels which are built to conform to existing pressure vessel design. Generally these tanks are filled to about 80% of the total capacity with the remaining 20% left vacant to allow for thermal expansion of the fuel.

Currently filling systems for these tanks allow propane gas to escape into the atmosphere during filling. When the 80% level is reached, these tanks expel liquid propane, at which time the operator doing the filling must immediately stop filling. In the event of overfilling the vehicle must be driven off to a safe area where the excess liquid fuel can be bled off. These systems are both ineffective and dangerous and lead to a source of environmental pollution.

One solution to these filling problems is the construction of a tank having a primary compartment and an expansion compartment which is smaller than the primary compartment. A valve assembly is constructed which allows expanded fuel to move from the primary compartment to the expansion compartment in order to relieve pressure in the primary compartment.

U.S. Pat. No. 5,411,058 issued to J. W. Walsh et al. on May 2, 1995 shows a fuel reservoir for a gaseous fuel made up of a primary compartment which is designed to be totally filled and a secondary compartment which is horizontally adjacent to the primary compartment and has very little vertical expansion space because of the specific tank configuration disclosed. A spring loaded pressure relief valve allows fuel to pass from the primary compartment to the expansion compartment when a specific pressure difference exists between the two compartments. Each compartment has an outlet through which fuel can be drawn. Hence, there are separate lines coming from each separate compartment which lead to the engine. A check valve is used to permit fuel to be drawn first from the expansion compartment and then from the primary compartment. This known system is quite complex as it is designed to provide both a liquid fuel and a gaseous fuel to the vehicle's internal combustion engine. This system has an integrated gaseous fuel control and handling unit.

Current propane fuel systems have the additional problem of having propane fuel trapped in the lines and fittings between the tank shut-off valve and the fuel lock-off. Expansion of the fuel leads to burst lines and fittings and the discharge of propane into the atmosphere.

In order to address this problem, pressure sensitive relief valves were commonly introduced between the tank valve and the lock-off. The valves are set to relieve the excess hydrostatic pressure by venting the propane into the atmosphere. This can lead to propane building up beneath the vehicle, which is very dangerous and environmentally offensive.

SUMMARY OF THE INVENTION

The present invention relates to a fuel storage system for a fuel having liquid and gaseous phases. The storage system has a main storage tank with a main tank port which allows fuel to flow into the main storage tank. Also, the system has an expansion tank with an inlet port for fuel to flow into the expansion tank. An outlet port also is provided on the expansion tank such that fuel can leave the expansion tank. The expansion tank is substantially smaller than the storage tank.

Included in this system is a valve arrangement for filling the main storage tank with fuel and for permitting fuel to flow from the main storage tank to the expansion tank during normal use of the system. A valve chamber forms part of the valve arrangement as does a valve member which is movable in the chamber between a normal operating position and a tank filling position. The valve arrangement also has means for biasing the valve member towards the normal operating position and a filling port leading to the valve chamber through which fuel under pressure can be fed into the valve chamber. The chamber opens into the main tank port. The flow of fuel flowing under pressure into the valve chamber in order to fill the storage tank causes the valve member to move to the tank filling position. This allows for the free flow of fuel from the chamber through the main tank port and into the storage tank.

The fuel storage system also has a fuel passage extending from the chamber to the expansion tank. When the valve member is in the tank filling position, the valve member acts to close the fuel passage. In the situation where the valve member is in the normal operating position and when the pressure in the storage tank exceeds the pressure in the expansion tank, fuel is able to flow from the storage tank through the chamber and through the fuel passage into the expansion tank.

In accordance with another embodiment of the present invention, a filling apparatus for a fuel storage system having a main storage tank and an expansion tank, which is substantially smaller than the storage tank, is provided which has a valve housing forming a valve chamber and passage means connected to the chamber for filling the main storage tank. The passage means has an outlet adapted to open into the storage tank. A conduit permits fuel to flow under pressure from the main storage tank to the expansion tank. A valve device is included in the filling apparatus, which device is movable in the valve chamber between the normal operating position where the fuel can flow under pressure through the conduit to the expansion tank and a tank filling position where the valve device prevents the flow of fuel through the conduit. A biasing device is mounted in the housing and biases the valve device towards the normal operating position. The valve device can be moved to the tank filling position by fuel flowing under pressure in the chamber when the main storage tank is being filled with fuel.

According to another embodiment of this invention, a valve mechanism with a pressure relieving capability comprises a main valve body having a primary valve chamber formed therein, an intake opening connected to the chamber, an outlet connected to the chamber and a valve seat. A valve member is movable in the primary valve chamber between a valve closing position where the valve member engages the valve seat and an open position, where the valve member is spaced from the valve seat. When the valve member is in the open position and the mechanism is in use, a fluid is able to flow from the intake opening through the chamber and out of the outlet. The valve member has a relief valve chamber formed therein. An actuator for moving the valve member in a desired manner between the closing position and the open position also forms part of the valve mechanism. A one-way pressure relief valve device is located in the relief valve chamber. A first flowback passageway in the valve member connects the primary valve chamber to the relief valve chamber. Also, a second flowback passageway connects the relief valve chamber to the intake opening when the valve member is in the valve closing position. In the use of the valve mechanism, the relief valve device permits fluid to flow from the outlet to the inlet opening when fluid pressure at the outlet reaches a predetermined maximum level.

Another embodiment of this invention provides a fuel storage system for a fuel having liquid and gaseous phases, the system comprising at least one tank for holding the fuel, a tank inlet for passage of the fuel into the tank(s), and a tank outlet for passage of the fuel in liquid phase out of the tank(s). This fuel storage system has the above described valve mechanism connected to the outlet, which mechanism provides means for shutting off the fuel flow from the tank(s).

DETAILED DESCRIPTION OF PREFERRED EMBODIMENTS

Figure 1:
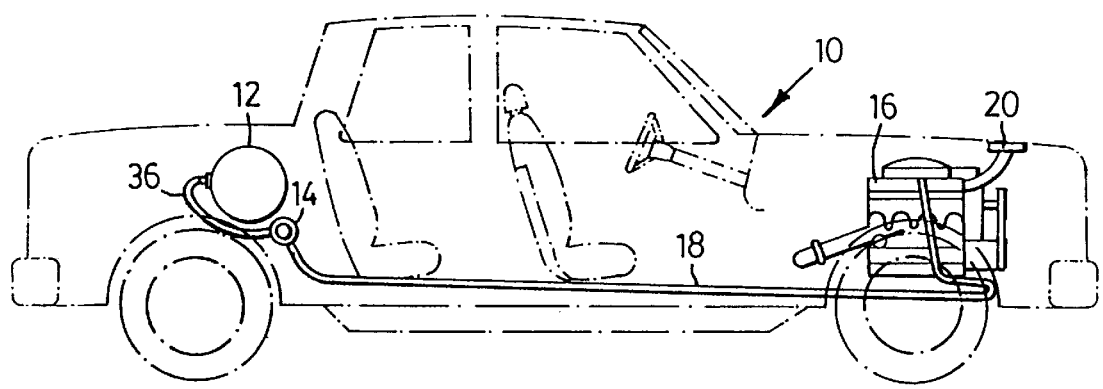
FIG. 1 depicts an overall side view, partly in phantom, of a propane powered vehicle that incorporates the fuel storage system of the present invention.

FIG. 1 illustrates a propane powered vehicle or automobile 10 employing both the fuel storage system 12 of the invention and a shut off valve mechanism 14 constructed in accordance with another aspect of the invention. The fuel storage system 12 provides liquid propane, a fuel having liquid and gaseous phases, to an internal combustion engine 16 that has been set up to burn propane fuel. Internal combustion engines for cars and trucks that are powered by propane are well known in the vehicle industry. The internal combustion engine 16 is of standard construction and is not part of the present invention. Propane is delivered to the engine from the fuel storage system 12 by means of a standard propane fuel line 18. The line 18 delivers the propane to a suitable propane fuel delivery device which may comprise a carburettor or fuel injectors (not shown) controlled by an electronic fuel delivery controller 20. A heating device for the propane fuel may also be provided in the engine compartment to prevent freeze up when the fuel is converted to gaseous form.

Figure 2:
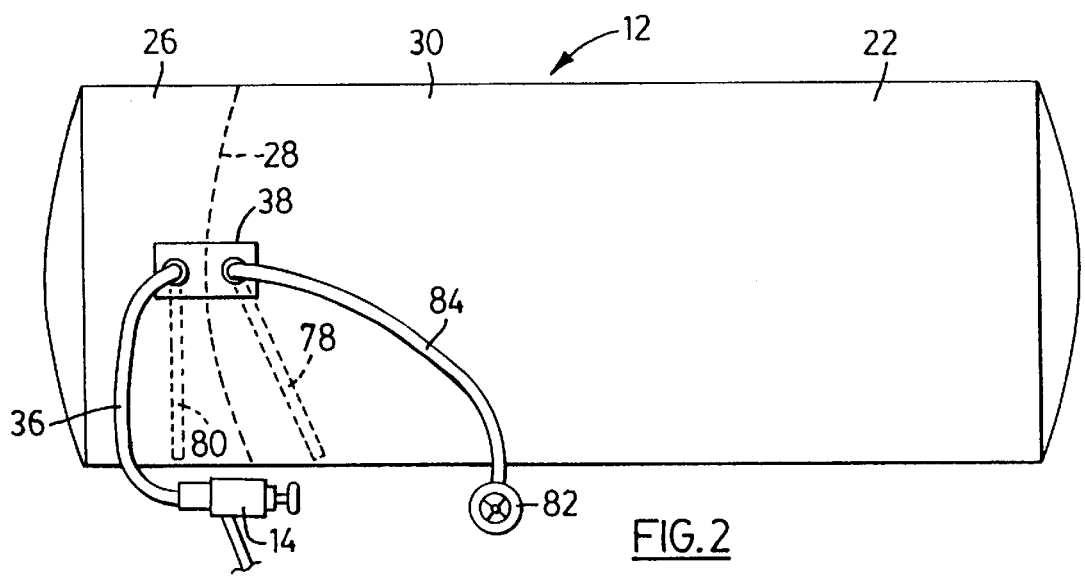
FIG. 2 is a side elevation of the fuel storage system shown connected to a shut-off valve constructed in accordance with the invention.

In the illustrated vehicle 10, the propane storage tank is mounted in the trunk region of the car and it is of standard, cylindrical configuration on the outside (see FIG. 2). As is well known in the industry, other locations on the vehicle for mounting the storage tank are also possible.

Figure 3:
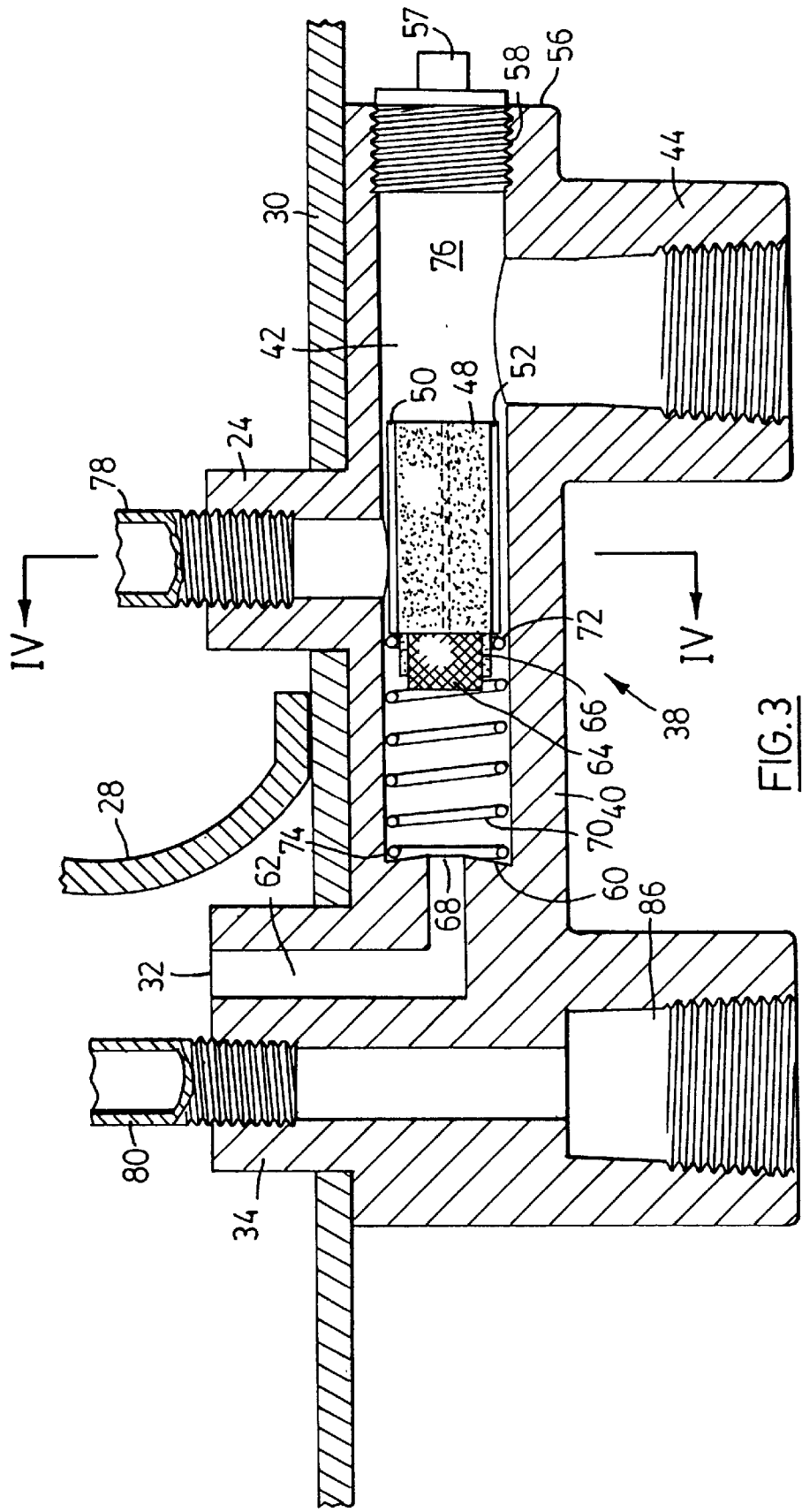
FIG. 3 is a longitudinal cross-section taken through the center line of the valve chamber and illustrating a filling apparatus constructed in accordance with one aspect of the invention.

The fuel storage system of the invention includes a main storage tank indicated at 22 in FIG. 2. This tank is equipped with a main tank port 24 (see FIG. 3) for the passage of propane into or out of the storage tank. There is also an expansion tank 26 which is substantially smaller than the storage tank 22. The storage tank and the expansion tank can be separated by a common interior wall 28 which can form a concave surface facing towards the storage tank region. The interior wall 28 is surrounded by exterior tank wall 30. Both walls can be made of high strength sheet steel in the same manner as presently used propane tanks. As shown in FIG. 3, the expansion tank has an inlet port 32 for the passage of fuel into the expansion tank and also an outlet 34 for the fuel, this outlet leading to a fuel line 36 that is connected to the aforementioned shut-off valve 14 for the tank.

The fuel storage system 12 includes a valve arrangement mounted on the combined storage tank and expansion tank for filling the main storage tank 22 with the propane fuel and for permitting this fuel to flow from the main storage tank 22 to the expansion tank 26 during normal use of the system. The valve arrangement 38 includes a valve housing 40 forming a valve chamber 42. The valve chamber also forms passage means connected to the chamber 42 for filling the main storage tank 22. The passage means can include a threaded inlet port 44 as well as the main tank port 24 which constitutes an outlet adapted to open into the storage tank. The valve housing is preferably made of cast steel to provide good welding properties in order to assemble it to the tank.

Figure 4:
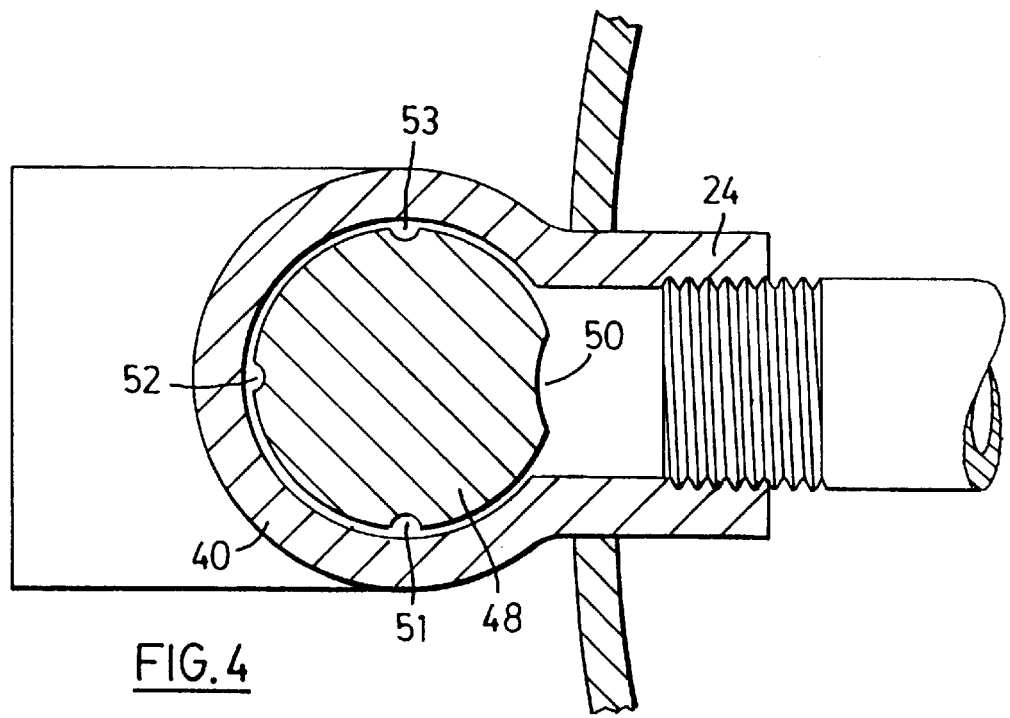
FIG. 4 is a transverse cross-section showing the valve plunger and taken along the line IV—IV of FIG. 3.

Located in the chamber 42 is a valve member or valve plunger 48, the body of which is preferably made of MD filled nylon. The valve member has a generally cylindrical configuration as shown in FIG. 4 but extending longitudinally of the valve member are several, for example four, exterior grooves 50 to 53. It will be understood that there can be as few as one groove and more than four grooves if desired. In the illustrated embodiment of FIG. 4, the groove 50 is larger than grooves 51 to 53 because this groove is adjacent the main tank port 24. This permits greater flow of fuel along the groove 50 as explained in more detail hereinafter. However, it is possible for all of the grooves in the valve member to be the same or identical in their transverse cross-section. The valve member 48 is movable in the chamber between a normal operating position (shown in FIG. 3) and a tank filling position, which is the position the valve member assumes when the storage tank 22 is being filled with propane.

In the illustrated valve arrangement, the chamber 42 extends to a point close to one end 56 of the housing 40. It will be understood that this end of the chamber will normally be plugged by means of a threaded metal plug 57 which also provides access to the valve body for assembly and servicing. This plug connects to threads 58 formed for this purpose at the end of the chamber. An opposite end 60 of the chamber is connected to a fuel passage 62 which extends from the chamber 42 to the expansion tank 26. In order that the passage 62 can be made quite short, it is preferred that the valve arrangement 38 be mounted on the aforementioned exterior tank wall 30 in the region of the interior wall 28 which is welded thereto.

It will be understood that the inlet port 44 formed by the housing constitutes a filling port leading to the valve chamber and through which fuel under pressure can be fed into the valve chamber. The flow of fuel under pressure into the valve chamber 42 in order to fill the storage tank causes the valve member 48 to move to the tank filling position. In this position, the valve member 48 permits the free flow of fuel from the chamber 42 and through the main tank port 24 into the storage tank. It will be understood that the valve member 48 is provided with a valve seal 64 which can be made of a silicon elastomer, a suitable rubber, or a rubber like material that will not deteriorate in the presence of propane. The seal 64 can be mounted in a cylindrical end chamber 66 formed in one end of the valve member. In the aforementioned tank filling position, the seal 64 acts to close the adjacent end 68 of the fuel passage 62 in a sealing manner. The valve arrangement 38 includes means for biasing the valve member 48 towards its normal operating position. In the illustrated preferred embodiment, the biasing means is a coil spring 70 having a first end 72 that engages the valve member or plunger 48 and a second end 74 that rests against an end wall of the chamber. The preferred spring 70 is made of stainless steel. It will be understood that when the inlet port 44 is attached to a filler hose and the flow of propane is initiated, the liquid propane will fill the section of the chamber 42 indicated at 76. Because the propane is flowing under considerable pressure, the pressure of the fuel entering the section 76 pushes the plunger 48 to the left (as seen in FIG. 3) overcoming the force of the spring 70 and compressing same. Quickly this results in the seal closing off the orifice at 68. When this occurs, the tank port 24 is open to the valve chamber 42, permitting propane to flow freely into the main storage tank through a fuel tube 78 which extends to a point near the bottom of the storage tank as shown in FIG. 2.

The fuel tube 78, which is also used to withdraw propane from the storage tank, is provided to ensure that it is always liquid propane that is being withdrawn from the storage tank into the expansion tank. Similarly, a further fuel tube 80 is provided in the expansion tank 26. This pipe is connected to the aforementioned outlet 34 and extends to the bottom or lower region of the expansion tank on the inside thereof. Again, the purpose of the pipe 80 is to ensure that it is liquid propane that is being drawn from the expansion tank and through the fuel line to the carburettor or fuel injectors. Note also that the valve arrangement 38 is mounted on the side of the cylindrical tank a substantial distance above the bottom of the tank. In the illustrated embodiment, the valve arrangement 38 is approximately midway between the top and bottom of the tank but other locations are possible, for example, at the top of the tank.

When the main storage tank 22 is completely filled, a pressure relief valve on the filling pump will open due to the substantial increase in pressure and fuel flow into the storage tank will cease. The filling hose is then disconnected from a filler valve 82 which can be of standard construction. The filler valve 82 is preferably a double check filler valve such as those sold under the trade name REGO. These valves permit the flow of propane into the storage tank under pressure after removal of a valve cap but do not permit the flow of propane in the opposite direction out of the tank. The filler valve is mounted at a suitable location for filling purposes and is connected to the inlet port 44 by a fuel line 84.

Instead of a standard filler valve 82 of the aforementioned type, a preferred form of quick release coupling for use with the present invention is that sold by Staubli under the trade name or trade-mark SCB. These couplings are specially designed for safe and clean connection and disconnection operations without spillage of the propane fuel. Their flat face design avoids any introduction of pollutants into the circuit.

Once the refuelling of the storage tank 22 is completed, the spring 70 will return the valve plunger 48 to its normal operating position, separating the seal 64 from the orifice at 68. Even though there may be propane fuel trapped in section 76 and the line leading to inlet port 44, movement of the valve plunger to its normal operating position is possible because the valve plunger forms a further fuel passage to permit the propane to flow past the plunger and into the expansion tank. In the illustrated embodiment, this further fuel passage is provided by the aforementioned longitudinal grooves 50 to 53. Thus, the propane can flow from the section 76 to the spring side of the plunger and then through the passage 62.

As the vehicle is operated and fuel is used by its engine, liquid propane is picked up by the tube 80 from the bottom of the expansion tank and leaves through the outlet port 86. The fuel then flows under pressure through the tank shut-off valve 14 and into the engine fuel supply line 18. As the propane fuel is used, the pressure will decrease in the expansion tank 26 and this results in liquid fuel from the storage tank 22, which is now at higher pressure, being picked up from the bottom of the main storage tank by the tube 78. By means of the aforementioned grooves 50 to 53 and the passageway 62, the fuel flows into the expansion tank to replace the fuel that has been used. It will be appreciated that because the propane fuel is always discharged from the expansion tank, little liquid fuel accumulates in the expansion tank. Because of this fact, the main storage tank 22 can be completely filled during the filling operation with no danger of hydrostatic pressure build up due to temperature changes. Should the temperature increase and the liquid fuel expand in the main storage tank, excess fuel volume will flow through the tube 78 into the valve chamber, along the grooves 50 to 53 and through the passage 62 into the expansion tank, thus safely reducing pressure in the storage tank without the need to expel fuel into the atmosphere.

In the case of an accident in which the fuel supply line from the expansion tank to the engine is ruptured, this will cause the rate of fuel flow from the expansion tank to be very high in comparison to conditions during normal engine usage. This will cause a large pressure drop in the expansion tank resulting in fuel flowing rapidly from the main storage tank 22. However, as the fuel begins to move rapidly along the longitudinal grooves in the valve plunger and through the passage 62 into the expansion tank, the fuel in the section 76 of the valve chamber will be at a higher pressure because of little or no fuel movement in this section. This will increase the pressure in the section 76 and cause the valve plunger to move towards the orifice at 68. This will result in blockage of the orifice at 68 by the seal causing the flow of fuel from the main tank to be blocked off until such time as the pressure in the expansion tank can be raised to a point where the spring 70 is able to move the seal 64 away from the orifice at 68. This is an important safety feature in that the propane fuel is confined in the tank where it cannot add to the fire hazard.

In a preferred embodiment of the present fuel storage system designed for use in vehicles, the main storage tank has a volume that is about ten times that of the expansion tank. It is recommended that the main storage tank be at least four times larger than the expansion tank and preferably at least eight times the volume of the expansion tank.

Figure 6:
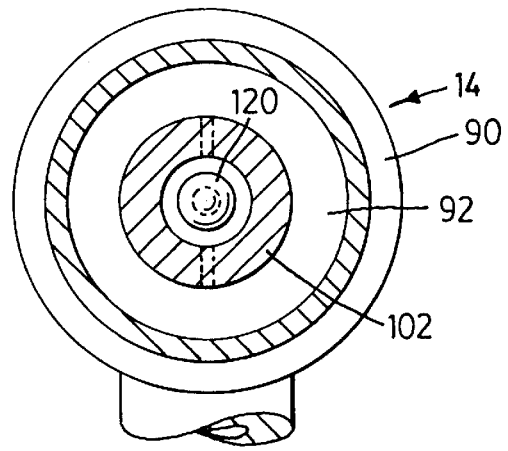
FIG. 6 is a transverse cross-section taken along the line VI—VI of FIG. 5.
Figure 5:
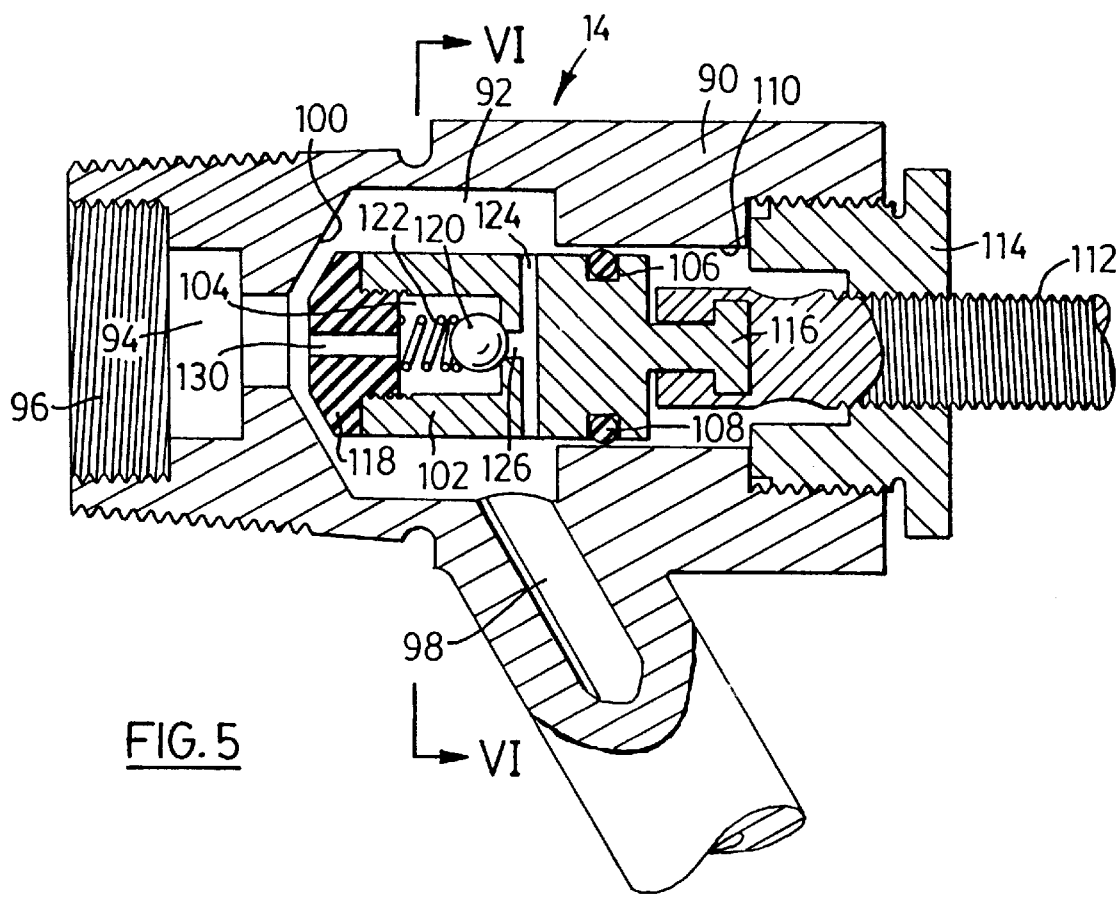
FIG. 5 is a longitudinal cross section of a shut-off valve mechanism constructed in accordance with another aspect of the invention.

Preferably, the fuel storage system described above is used in conjunction with the unique shut-off valve with a pressure relieving capability constructed according to another aspect of this invention. This shut-off valve 14 is illustrated in FIGS. 5 and 6 of the drawings. The valve has a main valve body 90 preferably made of stainless steel and having a primary valve chamber 92 formed therein. An intake opening 94 is connected to the chamber 92 and this opening can be threaded at 96 for connection of the shut-off valve to a fuel line, such as the line 36 shown in FIG. 2 or to a fuel tank. An outlet 98 is also connected to the chamber 92 and extends from the chamber's cylindrical side wall. At one end of the chamber 92 is a conical valve seat 100. It will be appreciated that the valve seat can take a variety of configurations and it is shaped to fit in a sealing manner with the movable valve member.

In the illustrated shut-off valve, the valve member or valve plunger 102 is generally cylindrical and preferably made of stainless steel. It is movable in the valve chamber 92 between a valve closing position where the valve member engages the valve seat 100 and an open position (shown in FIG. 5) where the valve member is spaced from the valve seat. When the valve member is in the open position and the shut-off valve is in use, liquid propane or liquid fuel is able to flow from the intake opening 94, through the chamber 92 and out the outlet 98. The valve member 102 has a relief valve chamber 104 which is also of cylindrical configuration formed therein. The purpose of the relief valve chamber is described hereinafter.

Extending around the valve member 102 is an annular groove 106 and mounted therein is a annular seal such as O-ring 108. The O-ring prevents propane under pressure from escaping through a passageway 110 provided for actuator rod or valve stem 112. The stem 112 is preferably made of stainless steel and threadedly engages stainless steel packing gland 114, which in turn is threaded into the valve body. The stem 112 is rotatably connected to the valve member 102 by means of a knob-like extension 116 formed on the valve member. Mounted on an opposite end of the valve member is a valve seal 118 which also forms one end of the relief valve chamber 102. The seal or plug 118 is preferably made of a polyurethane elastomer.

A one-way pressure relief valve device is located in valve chamber 104. This device includes a ball check 120 and a suitable coil spring 122 extending between the ball check and the end of the relief valve chamber formed by the seal 118. The spring and the ball check can be made of stainless steel.

A first flow back passageway 124 connects the primary valve chamber 92 to the relief valve chamber 104. In the illustrated embodiment, this passageway includes a transverse passageway extending across the valve member 102 and located between the relief valve chamber 104 and the actuator or valve stem 112 and also an axially extending passageway 126 extending from the transverse passageway to the relief valve chamber. At the end of this short passageway is the seat for ball check 120. A second flow back passageway 130 connects the relief valve chamber to the intake opening 94 when the valve plunger is in its closing position.

It will be understood that the shut-off valve mechanism of FIGS. 5 and 6 has been provided to overcome an inherent problem in many current propane fuel systems for automobiles and other vehicles. This known problem arises from the fact that when the main propane tank is closed and the propane fuel lock is in the closed or off position, ie. the ignition is off, liquid propane becomes trapped in the lines and fittings between the currently used tank shut-off valve and the fuel lock-off. With an increase in temperature, this liquid fuel expands and can develop an extremely high hydrostatic pressure, one which exceeds the designed pressure limits of the components in the line. This can lead to burst lines and/or fittings and discharge of propane into the atmosphere.

In order to rectify the aforementioned problem, the shut-off valve 14 of the invention allows excessive pressure in the fuel supply lines between the fuel storage tank or tanks and the engine lock off valve to be relieved by allowing fuel to flow back into the fuel tank rather than purging it into the atmosphere.

The shut-off valve 14 can be opened or closed in the conventional manner using the valve stem 112 which can, for example, be turned manually using a handle mounted on the valve stem or by a suitably controlled electric motor (not shown). When the valve plunger 102 is moved to the open position, propane fuel is able to flow through the intake opening 94, into the valve chamber 92 and then to the outlet 98 from which the fuel flows to the engine. When the shut-off valve is closed, the valve stem 112 pushes the valve plunger against the valve seat 100, blocking off the opening at 94, thus preventing the further passage of fuel through the valve. Any fuel from the intake opening which passes through the passageway 130 in the seal is unable to pass into the valve chamber 92 because of the ball check held in position by the spring. Then, if hydrostatic pressure builds up in the fuel line between the shut-off valve 14 and the engine lock-off valve due to temperature changes, the back up pressure in the fuel line will be released by the ball check 120 compressing the spring 122.

When the ball check moves away from its seat, high pressure liquid fuel can move from the outlet 98 to the passageway 124 and past the ball check 120. The fuel continues through the passageway 130 and back into the expansion tank 26 (assuming the shut-off valve is connected up to the fuel storage system of the invention). When the pressure build up has been adequately relieved, the ball check 120 again moves to the closing position under pressure from the spring 122.

It will thus be understood that the shut-off valve 14 of the invention can be part of a fuel storage system for a fuel such as propane which has liquid and gaseous phases. This system can include at least one tank for holding the fuel, a tank inlet for the passage of fuel into the tank and a tank outlet for the passage of fuel in liquid phase out of the tank. The valve mechanism 14 of the invention is connected to this outlet and it provides means for shutting off the fuel flow from the tank. This fuel storage system can also include a fuel line for delivering fuel to a vehicle engine, this line being connected to the outlet of the main valve body 90. Such a fuel line is illustrated at 18 in FIG. 1.

It will be apparent to one skilled in this art that various modifications and changes can be made to the above described fuel storage system and the valve mechanism or shut-off valve without departing from the spirit and scope of this invention. Accordingly, all such modifications and changes as fall within the scope of the appended claims are intended to be part of this invention.

I therefore claim:

1. A fuel storage system for a fuel having liquid and gaseous phases comprising:

a main storage tank having a main tank port for the passage of fuel into said storage tank;

an expansion tank having an inlet port for the passage of fuel into said expansion tank and an outlet for said fuel, said expansion tank being substantially smaller than said storage tank;

a valve arrangement for filling said main storage tank with said fuel and for permitting said fuel to flow from said main storage tank to said expansion tank during normal use of the system, said arrangement including a valve chamber, a valve member movable in said chamber between a normal operating position and a tank filling position, means for biasing said valve member towards said normal operating position, and a filling port leading to said valve chamber and through which said fuel under pressure can be fed into said valve chamber, wherein said chamber opens into said main tank port and the flow of fuel under pressure into said valve chamber in order to fill said storage tank causes said valve member to move to said tank filling position, thereby permitting free flow of said fuel from said chamber and through said main tank port into said storage tank;

and a fuel passage extending from said chamber to said expansion tank, said valve member acting to close said fuel passage when said valve member is in said tank filling position, wherein, when pressure in said storage tank exceeds pressure in said expansion tank and said valve member is in said normal operating position, said fuel is able to flow from said storage tank, through said chamber, and through said fuel passage into said expansion tank.

2. A fuel storage system according to claim 1 wherein said valve member is a valve plunger having a seal mounted thereon, said seal acting to close an adjacent end of said fuel passage in a sealing manner when said main storage tank is being filled.

3. A fuel storage system according to claim 2 wherein said valve plunger forms a further fuel passage to permit fuel in said main storage tank to flow past said plunger and into said expansion tank when said valve member is in its normal operating position.

4. A fuel storage system according to claim 3 wherein said biasing means is a coil spring having first and second ends, said first end engaging said valve plunger and said second end resting against an end wall of said chamber.

5. A fuel storage system according to claim 1 wherein said valve arrangement is mounted substantially on the exterior of the tanks.

6. A fuel storage system according to claim 1 wherein said main storage tank and said expansion tank are separated by a common interior wall surrounded by an exterior tank wall and said valve arrangement is mounted on said exterior tank wall in the region of said interior wall.

7. A fuel storage system according to claim 1 wherein said main storage tank has a volume at least as large as eight times the volume of said expansion tank.

8. A fuel storage system according to claim 1 wherein said valve arrangement is mounted a substantial height above a bottom of said storage tank, a first pipe connected to said main tank port extends to a lower region of said storage tank on the inside thereof, and a second pipe connected to said outlet of the expansion tank extends to a lower region of said expansion tank on the inside thereof.

9. A fuel storage system according to claim 8 wherein said main storage tank and said expansion tank are separated by a common interior wall surrounded by an exterior tank wall and said valve arrangement is mounted on said exterior tank wall in the region of said interior wall.

10. A fuel storage system according to claim 9 wherein said valve member is a valve plunger movable in a linear manner in said chamber and having a seal mounted on one end thereof, said seal acting to close an adjacent end of said fuel passage in a sealing manner when said storage tank is being filled.

11. A filling apparatus for a fuel storage system having a main storage tank and an expansion tank which is substantially smaller than said storage tank, said apparatus comprising:

a valve housing forming a valve chamber and passage means connected to said chamber for filling said main storage tank, said passage means having an outlet adapted to open into said storage tank;

a conduit for permitting fuel to flow under pressure from said main storage tank to said expansion tank;

a valve device movable in said valve chamber between a normal operating position where said fuel can flow under pressure through said conduit to said expansion tank and a tank filling position where said valve device prevents the flow of fuel through said conduit; and a biasing device mounted in said housing and biasing said valve device towards said normal operating position, wherein said valve device can be moved to said tank filling position by fuel flowing under pressure in said chamber when said main storage tank is being filled with said fuel.

12. A filling apparatus according to claim 11 wherein said valve device is a valve plunger having a seal mounted thereon, said seal acting to close an adjacent end of said conduit in a sealing manner when said storage tank is being filled.

13. A filling apparatus according to claim 12 wherein said valve plunger is formed with one or more exterior grooves that permit fuel in said main storage tank to flow past said plunger and into said expansion tank when said valve device is in its normal operating position.

14. A filling apparatus according to claim 11 wherein said conduit is formed by said valve housing and has an inlet end located at one end of said valve chamber.

15. A filling apparatus according to claim 14 wherein said housing is formed with a separate additional fuel passageway for the flow of fuel from said expansion tank, said housing including means for connecting said additional fuel passageway to a fuel line.

16. A valve mechanism with a pressure relieving capability comprising:

a main valve body having a primary valve chamber formed therein, an intake opening connected to said chamber, an outlet connected to said chamber, and a valve seat;

a valve member movable in said primary valve chamber between a valve closing position where said valve member engages said valve seat and an open position where said valve member is spaced from said valve seat, wherein when the valve member is in the open position and said mechanism is in use, a fluid is able to flow from said intake opening, through said chamber and out said outlet, said valve member having a relief valve chamber formed therein;

an actuator for moving said valve member in a desired manner between said closing position and said open position;

a one way pressure relief valve device located in said relief valve chamber; and a first flowback passageway in said valve member connecting said primary valve chamber to said relief valve chamber, said first flowback passageway including a transverse passageway extending across said valve member and located between said relief valve chamber and said actuator and an axially extending passageway extending from said transverse passageway to said relief valve chamber, and a second flowback passageway connecting said relief valve chamber to said intake opening when said valve member is in said valve closing position, wherein in use of said mechanism, said relief valve device permits fluid flow from said outlet to said inlet opening when fluid pressure at said outlet reaches a predetermined maximum level.

17. A valve mechanism according to claim 16 wherein said pressure relief device includes a ball check and a coil spring extending between said ball check and an end of said relief valve chamber.

18. A fuel storage system for a fuel having liquid and gaseous phases comprising:

at least one tank for holding said fuel;

a tank inlet for passage of said fuel into said at least one tank;

a tank outlet for passage of said fuel in liquid phase out of said at least one tank; and a valve mechanism according to claim 16 connected to said outlet, said valve mechanism providing means for shutting off fuel flow from said at least one tank.

19. A fuel storage system according to claim 18 wherein a fuel line for delivering said fuel to a vehicle engine is connected to said outlet of the main valve body.

* * * * *